(12) United States Patent
Yamaoka et al.

(10) Patent No.: US 12,233,706 B2
(45) Date of Patent: Feb. 25, 2025

(54) VEHICLE DRIVE SYSTEM

(71) Applicant: Mazda Motor Corporation, Hiroshima (JP)

(72) Inventors: Yuya Yamaoka, Aki-gun (JP); Ryuichiro Amano, Aki-gun (JP); Yoshiaki Noguchi, Aki-gun (JP); Masaaki Kashimoto, Aki-gun (JP); Yusuke Oki, Aki-gun (JP); Li-Hsuan Huang, Taichung (TW); Sheng-Wei Chang, Taichung (TW)

(73) Assignee: Mazda Motor Corporation, Hiroshima (JP)

( * ) Notice: Subject to any disclaimer, the term of this patent is extended or adjusted under 35 U.S.C. 154(b) by 308 days.

(21) Appl. No.: 18/062,722

(22) Filed: Dec. 7, 2022

(65) Prior Publication Data

US 2023/0191898 A1 Jun. 22, 2023

(30) Foreign Application Priority Data

Dec. 22, 2021 (JP) ................................ 2021-207831

(51) Int. Cl.
*B60K 11/04* (2006.01)
*B60K 6/405* (2007.10)
(52) U.S. Cl.
CPC .............. *B60K 11/04* (2013.01); *B60K 6/405* (2013.01)
(58) Field of Classification Search
CPC ................................ B60K 6/405; B60K 11/04
USPC .................................................... 180/65.265
See application file for complete search history.

(56) References Cited

U.S. PATENT DOCUMENTS

| 9,772,027 | B2* | 9/2017 | Preston | F16H 57/0409 |
| 9,789,758 | B2* | 10/2017 | Zhao | B62D 21/11 |
| 10,458,533 | B2* | 10/2019 | Ono | F16H 57/0476 |
| 11,149,838 | B2* | 10/2021 | Hagino | F01M 9/06 |
| 2006/0054411 | A1* | 3/2006 | Fett | F16H 57/0412 |
| | | | | 184/6.22 |
| 2010/0019505 | A1* | 1/2010 | Frost | F01D 25/18 |
| | | | | 290/1 A |
| 2014/0155214 | A1* | 6/2014 | Kimura | F16H 57/045 |
| | | | | 475/160 |
| 2015/0096841 | A1* | 4/2015 | Bryde | F01M 11/0004 |
| | | | | 72/347 |

FOREIGN PATENT DOCUMENTS

JP 2020112246 A 7/2020

* cited by examiner

*Primary Examiner* — Colby M Hansen
(74) *Attorney, Agent, or Firm* — Alleman Hall & Tuttle LLP (57) ABSTRACT

A vehicle drive system includes a motor (drive motor), a generator, a reduction drive that reduces output of the motor, and a housing. At a position above a motor shaft, an oil passage, through which oil is supplied to each of the motor, the reduction drive, and the generator, is integrally formed with the housing. An oil pipe is attached to the housing and supplies the oil from an oil reservoir to the oil passage. At a position between the motor and the generator, the reduction drive is offset from the motor shaft in a second direction that is orthogonal to the first direction. The oil pipe is located between the motor and the generator in the first direction, and at least part of the oil pipe is located on an opposite side of the reduction drive with the motor shaft being interposed therebetween in the second direction.

7 Claims, 7 Drawing Sheets

VEHICLE DRIVE SYSTEM

TECHNICAL FIELD

A technique disclosed herein relates to a vehicle drive system.

BACKGROUND ART

A drive system for a hybrid vehicle is disclosed in JP2020-112246A. This drive system includes an internal combustion engine, a transmission, a motor, and a reduction drive. The transmission shifts output of the internal combustion engine for output. The reduction drive reduces output of the motor and transmits the reduced output to the transmission. The reduction drive is a gear reducer with parallel axes and is accommodated in a case. The case is shaped to surround a plurality of gears that constitute the reduction drive. An oil pipe is disposed in the case. The oil pipe supplies oil that is accumulated in a lower portion of the case to the reduction drive located in an upper portion of the case. In a narrow empty space between the gear of the reduction drive and a lateral wall of the case, the oil pipe extends upward while being curved along the lateral wall of the case.

SUMMARY OF THE INVENTION

Problem to be Solved by the Invention

In the conventional drive system disclosed in JP2020-112246A, the oil pipe is disposed in the narrow space. This structure significantly degrades assemblability of the oil pipe during manufacturing of the drive system.

A technique disclosed herein provides a vehicle drive system with a structure that facilitates assembly of an oil supply system.

Means for Solving the Problem

A technique disclosed herein relates to a vehicle drive system. This vehicle drive system includes a vehicle travel motor having a motor shaft that extends in a first direction orthogonal to an up-down direction; a generator that is located on a side of the motor in the first direction and generates electricity to be supplied to the motor; a reduction drive that is located between the motor and the generator in the first direction and meshes with the motor shaft to reduce output of the motor; and a housing that accommodates the motor, the reduction drive, and the generator. At a position above the motor shaft, an oil passage, through which oil is supplied to each of the motor, the reduction drive, and the generator, is integrally formed with the housing. the housing has an oil reservoir for storing the oil in a lower portion of the housing, and an oil pipe that is attached to the housing within the housing and supplies the oil from the oil reservoir to the oil passage is further provided. At a position between the motor and the generator, the reduction drive is offset from the motor shaft in a second direction that is orthogonal to the first direction. The oil pipe is located between the motor and the generator in the first direction, and at least part of the oil pipe is located on an opposite side of the reduction drive with the motor shaft being interposed therebetween in the second direction. At least a portion of the oil pipe is arranged to overlap the motor when viewed from the first direction.

According to this configuration, the vehicle drive system includes the motor, the reduction drive, and the generator. In the first direction, the motor, the reduction drive, and the generator are aligned in this order. The housing accommodates the motor, the reduction drive, and the generator.

The oil passage is integrally formed in the housing. The oil passage is formed above the motor shaft. The oil passage supplies the oil to each of the motor, the reduction drive, and the generator from above. The oil that has been supplied to each of the motor, the reduction drive, and the generator falls due to a gravitational force. The oil that has fallen is stored in the oil reservoir in the lower portion of the housing.

The oil pipe that is attached to the housing within the housing supplies the oil from the oil reservoir to the oil passage. The oil pipe is located between the motor and the generator.

Here, the reduction drive is located between the motor and the generator. An outer circumferential shape of each of the motor and the generator is a circular shape about a shaft. Accordingly, at least part of the outer circumferential shape of the housing is an arcuate shape with the shaft being a center.

In the housing, the reduction drive is offset from the motor shaft in the second direction that is orthogonal to the first direction. Accordingly, at a position between the motor and the generator in the housing, an empty space exists on the opposite side of the reduction drive with the motor shaft being interposed therebetween in the second direction. At least part of the oil pipe is located in the empty space. There is an ample space for arranging the oil pipe. This structure facilitates assembly work of the oil pipe during manufacturing of the vehicle drive system.

The housing may have a partition wall that is located between the motor and the reduction drive, part of the oil passage may be formed in the partition wall, and in the partition wall, a communication hole connected to the oil passage may be opened in the first direction, and the oil pipe may have a first insertion end that is inserted in an opening of the communication hole in the first direction.

The partition wall is a wall that is located between the motor and the reduction drive, and the wall that expands in a direction that crosses the first direction. In the partition wall, the communication hole is opened toward the first direction.

The oil pipe extends in the direction orthogonal to the first direction in order to supply the oil upward from the oil reservoir to the oil passage. During manufacturing of the vehicle drive system, a worker inserts the first insertion end of the oil pipe in the communication hole in the first direction. The oil pipe is connected to the oil passage through the communication hole and is attached to the housing. This structure facilitates the assembly work of the vehicle drive system.

An oil supply system in the vehicle drive system is configured by combining the oil passage formed in the partition wall and the oil pipe attached to the partition wall. By combining the oil passage and the oil pipe, a degree of freedom in layout of each of the oil passage and the oil pipe is increased. In addition, since the oil pipe and the housing are separate bodies, the housing is easily molded.

The vehicle drive system further includes an oil pump that is attached to outside of the housing, suctions the oil in the oil reservoir, and discharges the oil from a discharge port, in which the housing may be formed with a connection hole, to which the discharge port is connected, in a manner to penetrate the housing from inside to outside thereof, and the connection hole may be opened toward the first direction in the housing, and the oil pipe may have a second insertion end that is inserted in an opening of the connection hole in the first direction.

During manufacturing of the vehicle drive system, the worker inserts the second insertion end of the oil pipe from the opening of the connection hole in the first direction. In this way, the second insertion end is connected to a discharge port of the oil pump, and the oil pipe is attached to the housing. The insertion direction of the first insertion end is the same as the insertion direction of the second insertion end. This structure facilitates the assembly work of the vehicle drive system.

In addition, during manufacturing of the vehicle drive system, the worker attaches the oil pump to the housing such that the discharge port of the oil pump is connected to the connection hole, and attaches the oil pipe to the housing as described above. In this way, the oil pump and the oil pipe are connected via the connection hole. The oil pump and the oil pipe are not directly connected. This structure improves assemblability of the vehicle drive system.

The vehicle drive system further includes an oil cooler that is attached to the outside of the housing and cools the oil at a position between the oil reservoir and the oil passage. The oil pipe may be divided into a first oil pipe that communicates between the oil reservoir and the oil cooler, and a second oil pipe that couples the oil cooler and the oil passage.

Since the oil pipe is divided into the first oil pipe and the second oil pipe, a degree of freedom in layout of the oil reservoir, the oil cooler, and the oil passage is high.

The oil cooler may be located on an opposite side of the reduction drive with the motor shaft being interposed therebetween in the second direction and below the motor shaft, and the second oil pipe may extend linearly from a connection position with the oil cooler and a connection position with the oil passage.

In the second direction, the oil cooler and the oil pipe are located on the same side of the motor shaft. Thus, the second oil pipe can be arranged linearly in the empty space.

Moldability of the linear second oil pipe is high. In addition, since a length of the second oil pipe is short, channel resistance thereof is low.

Advantage of the Invention

The vehicle drive system has the structure that facilitates the assembly of the oil supply system.

MODES FOR CARRYING OUT THE INVENTION

A description will hereinafter be made on an embodiment of a vehicle drive system with reference to the drawings. The vehicle drive system described herein is merely illustrative.

(Overall Configuration of Vehicle Drive System)

Figure 1:
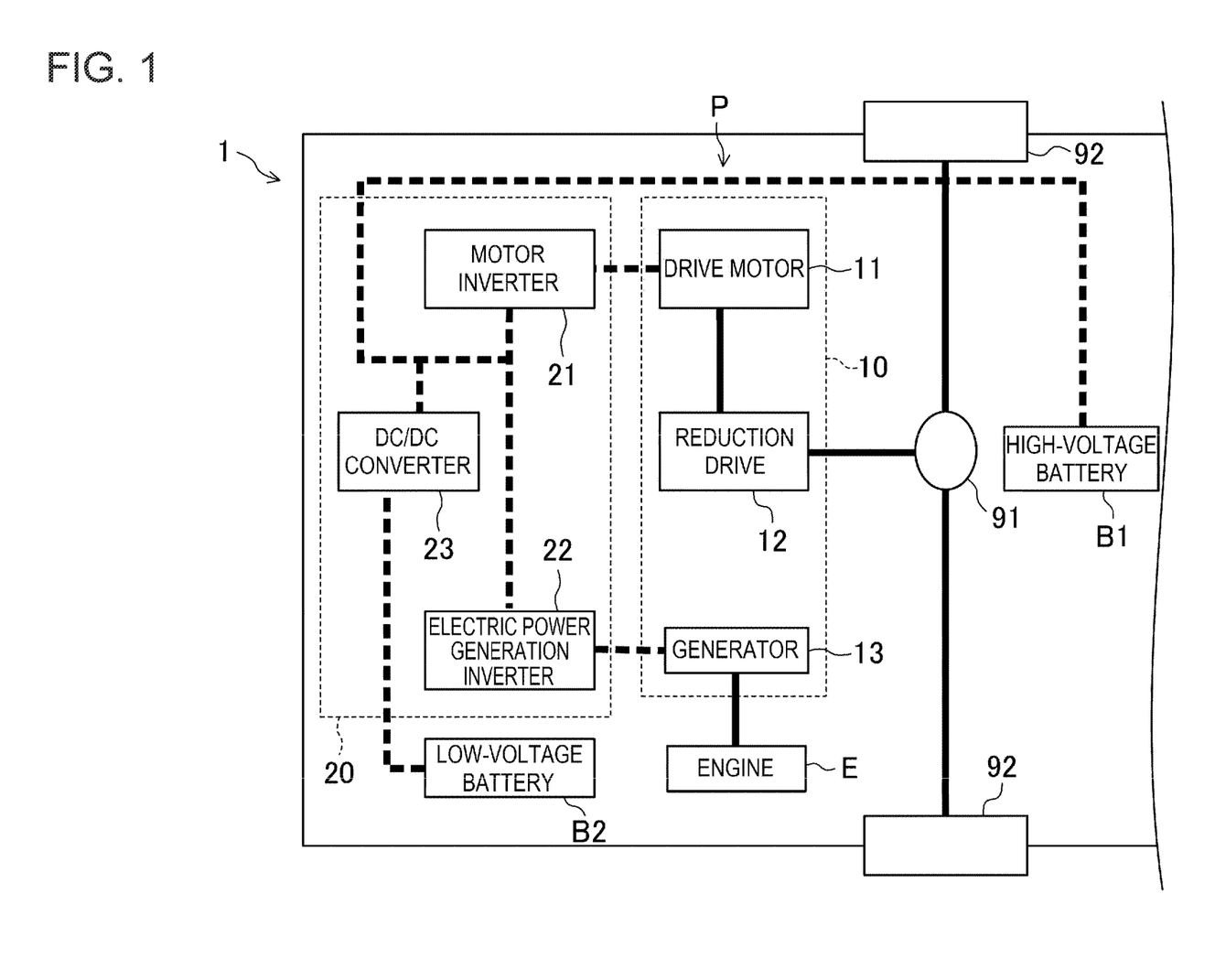
FIG. 1 is a block diagram of a vehicle drive system.

FIG. 1 is a block diagram of a vehicle drive system. FIG. 1 only schematically illustrates each element that constitutes a drive system P mounted on a vehicle 1. A position of each of the elements in FIG. 1 does not limit an actual position of the respective element.

The vehicle 1 is a series hybrid vehicle. The vehicle 1 includes the drive system P that is constructed of an electric drive unit 10 and an engine E for generating electric power. The electric drive unit 10 causes the vehicle 1 to travel by using the electric power.

The electric drive unit 10 has a drive motor 11, a reduction drive 12, and a generator 13. The drive motor 11 is supplied with the electric power and is thereby driven. The reduction drive 12 reduces output of the drive motor 11. The generator 13 generates electricity to be supplied to the drive motor 11.

The engine E is connected to the generator 13. The engine E drives the generator 13 such that the generator 13 generates the electricity. The drive motor 11 generates power for causing the vehicle 1 to travel. The power that is generated by the drive motor 11 is shifted by the reduction drive 12, and is thereafter transmitted to drive wheels 92 (front wheels herein) via a differential 91.

The vehicle 1 includes a high-voltage battery B1 and a low-voltage battery B2. The high-voltage battery B1 is charged with the electricity that is generated by the generator 13. An electric power generation inverter 22 is provided between the generator 13 and the high-voltage battery B1. The electric power generation inverter 22 is electrically connected to the generator 13 and the high-voltage battery B1. The generated electricity from the generator 13 is supplied to the high-voltage battery B1 via the electric power generation inverter 22. A motor inverter 21 is provided between the drive motor 11 and the high-voltage battery B1. The motor inverter 21 is electrically connected to the drive motor 11 and the high-voltage battery B1. The motor inverter 21 converts the electricity from the high-voltage battery B1 into the electric power for driving the drive motor 11, and outputs the converted electric power to the drive motor 11. A DC/DC converter 23 is provided between the high-voltage battery B1 and the low-voltage battery B2. The DC/DC converter 23 is electrically connected to the high-voltage battery B1 and the low-voltage battery B2. The electricity from the high-voltage battery B1 is supplied to the low-voltage battery B2 via the DC/DC converter 23. The generated electricity from the generator 13 is supplied to the low-voltage battery B2 via the electric power generation inverter 22 and the DC/DC converter 23. The motor inverter 21, the electric power generation inverter 22, and the DC/DC converter 23 constitute a control unit 20 that controls the electric drive unit 10.

(Mounted Structure of Drive System on Vehicle)

Figure 2:
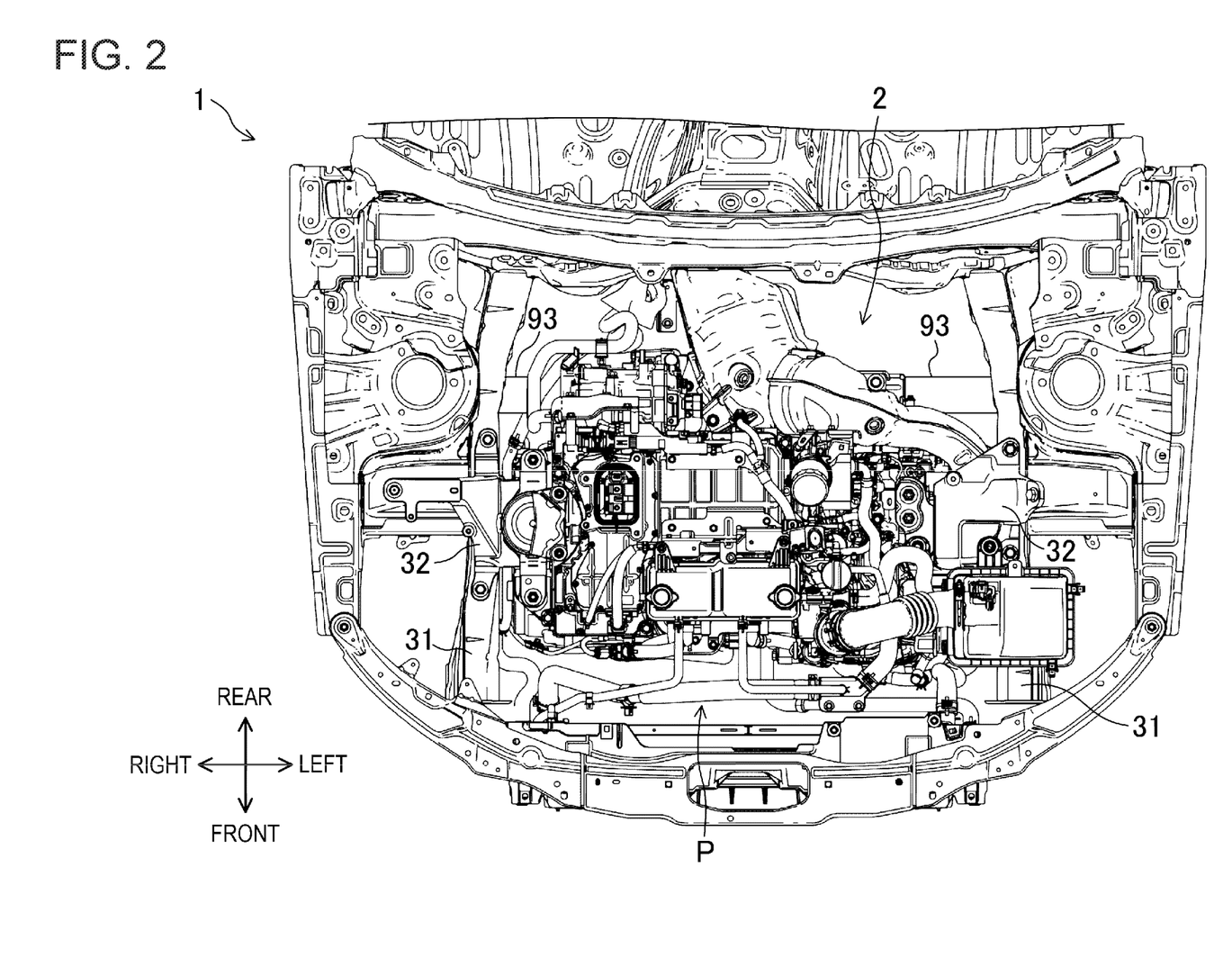
FIG. 2 is a plan view in which a front portion of a vehicle is seen from above.

FIG. 2 is a plan view in which a front portion of the vehicle 1 is seen from above. In the following description, front, rear, left, right, upper, and lower sides of the vehicle will simply be referred to as front, rear, left, right, upper, and lower sides, respectively. In a left-right direction, the left side at the time when the front side is seen from the rear side will be referred to as left, and the right side at such time will be referred to as right. The left-right direction is also a vehicle width direction.

The drive system P is disposed in a power unit compartment 2 that is formed in the front portion of the vehicle 1. In detail, the vehicle 1 includes a left and right pair of front side frames 31 extending in a front-rear direction, and the power unit compartment 2 for disposing the drive system P is formed between these left and right front side frames 31.

The drive system P is supported by the left and right front side frames 31 via support members 32.

Figure 3:
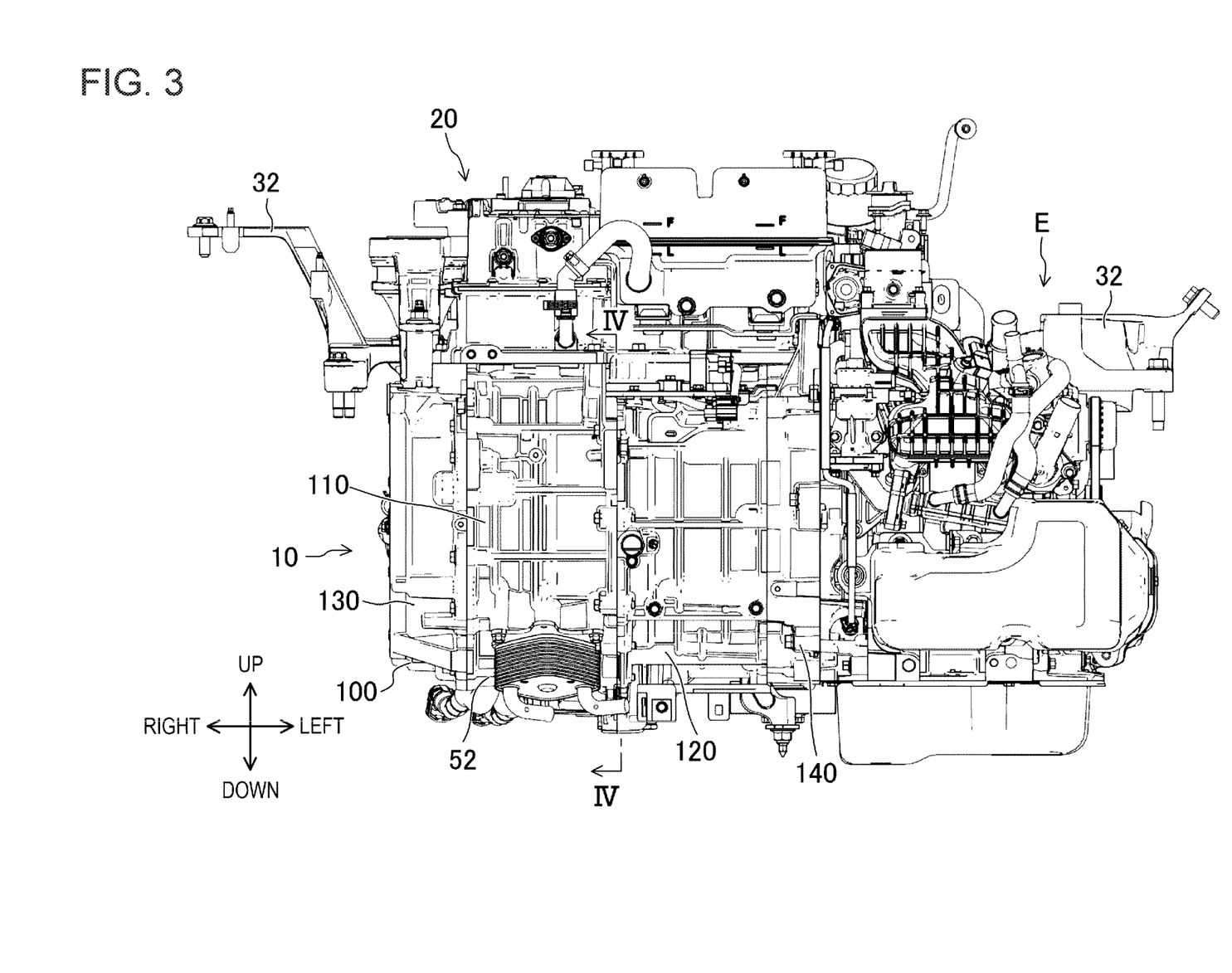
FIG. 3 is a front view of the vehicle drive system.

As illustrated in FIG. 3, the electric drive unit 10 and the control unit 20 are aligned in an up-down direction. Specifically, the control unit 20 is located on top of the electric drive unit 10.

Figure 4:
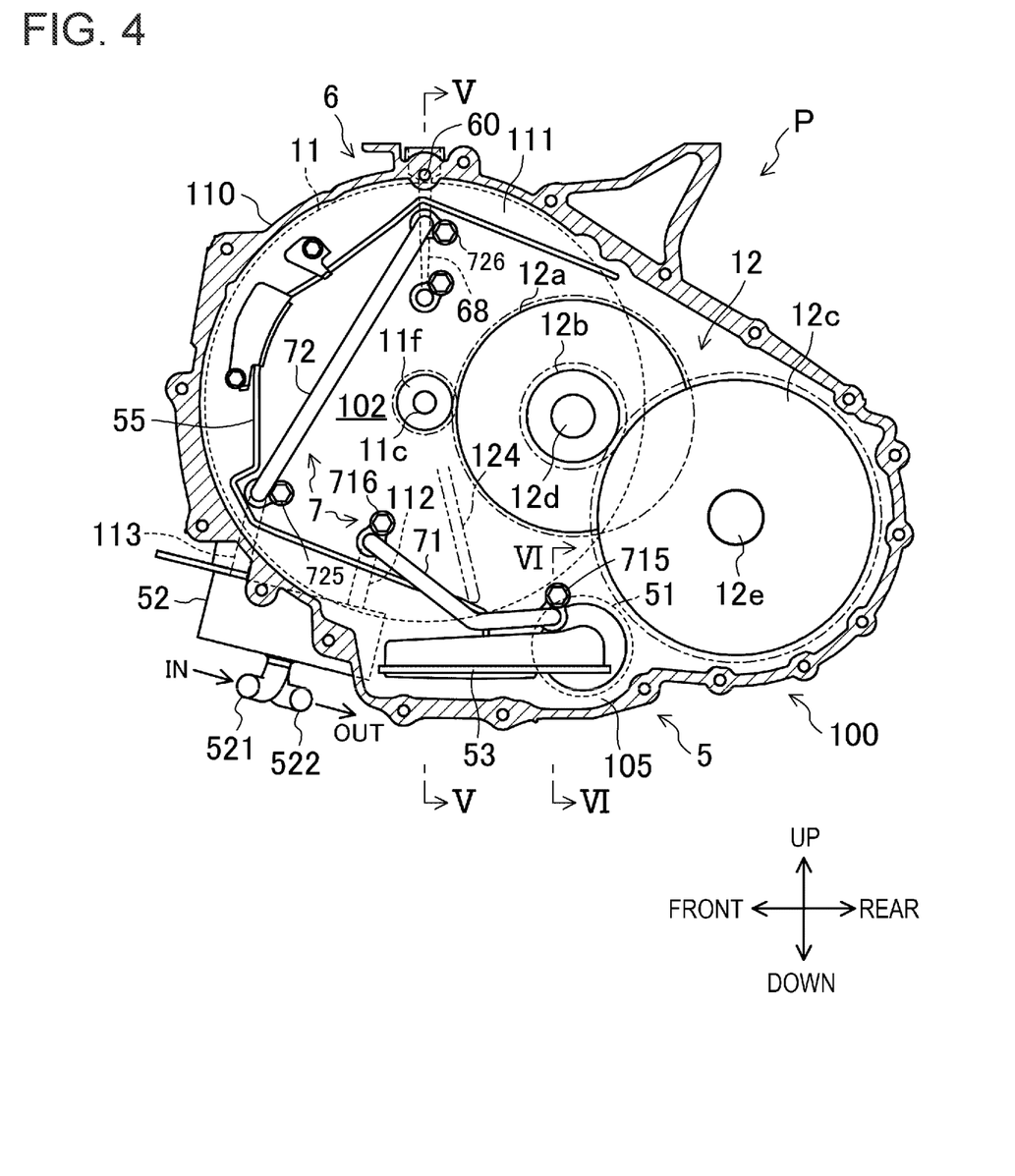
FIG. 4 illustrates a cross section that is taken along IV-IV in FIG. 3.
Figure 5:
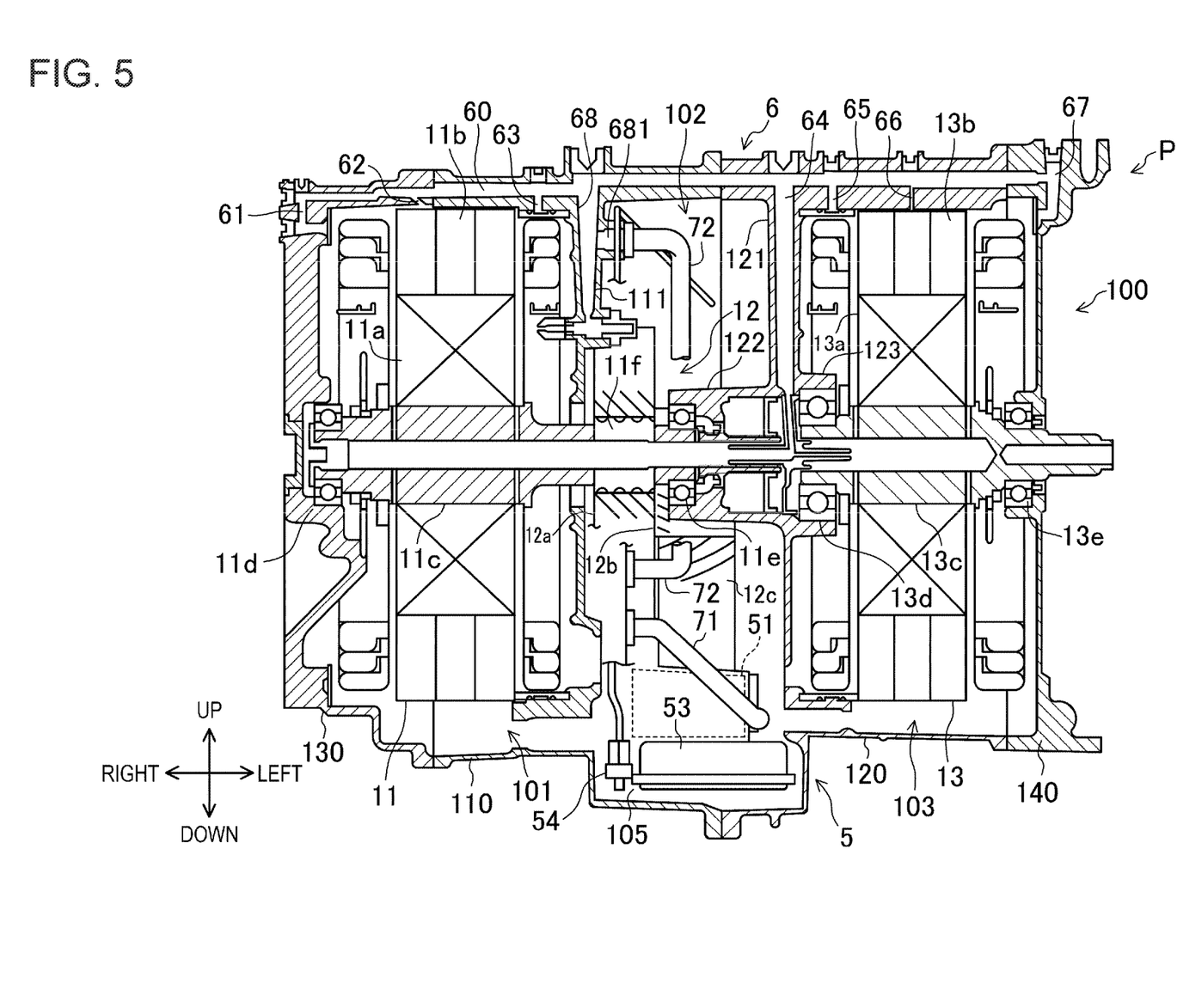
FIG. 5 illustrates a cross section that is taken along V-V in FIG. 4.

As illustrated in FIG. 4 and FIG. 5, the drive motor 11, the reduction drive 12, and the generator 13 are accommodated in a housing 100. The housing 100 is configured by integrating a plurality of members. The housing 100 has a first housing 110, a second housing 120, a right end cover 130, and a left end cover 140.

Each of the first housing 110 and the second housing 120 has a cylindrical shape, both of left and right ends of which are opened. Each of the right end cover 130 and the left end cover 140 has a lid shape, a right or left end of which is closed. The second housing 120 is arranged on the left side of the first housing 110, and the left end cover 140 is arranged on the left side of the second housing 120. The right end cover 130 is arranged on the right side of the first housing 110. The right end cover 130, the first housing 110, the second housing 120, and the left end cover 140 are aligned in this order from the right side to the left side. The first housing 110, the second housing 120, the left end cover 140, and the right end cover 130 are integrated by joining flanges, which are provided to left and right end portions, by bolts.

Each of the first housing 110, the second housing 120, the left end cover 140, and the right end cover 130 is made from an aluminum alloy and formed by casting, for example.

The engine E is disposed on the left side of the left end cover 140. That is, the engine E is located on the left side of the electric drive unit 10.

As illustrated in FIG. 5, the first housing 110 has a partition wall 111 for partitioning the housing 100 into a plurality of chambers. At an intermediate position of the first housing 110 in the left-right direction, the partition wall 111 expands in a direction that crosses the left-right direction. In detail, the partition wall 111 expands in the up-down direction and the front-rear direction, each of which is orthogonal to the left-right direction (also see FIG. 4). The second housing 120 has a partition wall 121. At an intermediate position of the second housing 120 in the left-right direction, the partition wall 121 also expands in the direction that crosses the left-right direction, in detail, the up-down direction and the front-rear direction, each of which is orthogonal to the left-right direction.

The drive motor 11 is accommodated in a first chamber 101 that is defined by the right end cover 130 and the partition wall 111 of the first housing 110. The generator 13 is accommodated in a third chamber 103 that is defined by the partition wall 121 of the second housing 120 and the left end cover 140. The reduction drive 12 is accommodated in a second chamber 102 that is defined by the partition wall 111 and the partition wall 121.

(Each Element of Electric Drive Unit)
Drive Motor

The drive motor 11 includes a rotor 11a, a stator 11b, and a motor shaft 11c. A rotating magnetic field is generated when three-phase AC power is supplied to the stator 11b, and the rotor 11a and the motor shaft 11c rotate due to the rotating magnetic field.

The rotor 11a is located in the first chamber 101. The rotor 11a has a magnet and a magnetic body. The rotor 11a is fixed to the motor shaft 11c. The rotor 11a and the motor shaft 11c rotate integrally.

The motor shaft 11c extends in the left-right direction. A first bearing 11d supports a right end portion of the motor shaft 11c in a manner to allow rotation thereof. The right end cover 130 holds the first bearing 11d. A left end portion of the motor shaft 11c penetrates the partition wall 111 of the first housing 110 and extends to the second chamber 102. A second bearing 11e supports a left end portion of the motor shaft 11c in a manner to allow rotation thereof. A first boss 122 that is formed integrally on the partition wall 121 holds the second bearing 11e. The first boss 122 is projected rightward into the second chamber 102 from the partition wall 121.

The stator 11b surrounds the rotor 11a. The stator 11b has a coil. The stator 11b is held by the first housing 110 and the right end cover 130.

Generator

The generator 13 includes a rotor 13a, a stator 13b, and a generator shaft 13c. When the generator shaft 13c and the rotor 13a rotate by the power of the engine E, the stator 13b generates the electricity by electromagnetic induction.

The rotor 13a is located in the third chamber 103. The rotor 13a has a magnet and a magnetic body. The rotor 13a is fixed to the generator shaft 13c. The rotor 13a and the generator shaft 13c rotate integrally.

The generator shaft 13c extends in the left-right direction. In this configuration example, the generator shaft 13c and the motor shaft 11c are located coaxially. However, the generator shaft 13c and the motor shaft 11c may be offset, that is, not coaxial. A third bearing 13d supports a right end portion of the generator shaft 13c in a manner to allow rotation thereof. A second boss 123 that is formed integrally on the partition wall 121 holds the third bearing 13d. The second boss 123 is projected leftward into the third chamber 103 from the partition wall 121. At a position corresponding to the partition wall 121, a right end of the generator shaft 13c and a left end of the motor shaft 11c face each other with a clearance being provided therebetween.

A left end portion of the generator shaft 13c penetrates the left end cover 140 and extends leftward. The left end portion of the generator shaft 13c is connected to an output shaft of the engine E. A fourth bearing 13e supports the left end portion of the generator shaft 13c in a manner to allow rotation thereof. The left end cover 140 holds the fourth bearing 13e.

The stator 13b surrounds the rotor 13a. The stator 13b has a coil. The stator 13b is held by the second housing 120 and the left end cover 140.

An outer diameter of the drive motor 11 is the same as an outer diameter of the generator 13. In detail, an outer diameter of the rotor 11a of the drive motor 11 is the same as an outer diameter of the rotor 13a of the generator 13, and an outer diameter of the stator 11b of the drive motor 11 is the same as an outer diameter of the stator 13b of the generator 13. In addition, the motor shaft 11c and the generator shaft 13c are located on the same axis. In order to accommodate the drive motor 11 and the generator 13 with the same outer diameter, an outer circumferential shape of a front portion of each of the first housing 110 and the second housing 120 is an arcuate outer circumferential shape in the same size (see FIG. 4).

Reduction Drive

As described above, the reduction drive 12 is located between the drive motor 11 and the generator 13. The reduction drive 12 is located on the left side of the drive motor 11 in the left-right direction. The reduction drive 12 is located behind the motor shaft 11c in the front-rear direction.

The reduction drive 12 is connected to the motor shaft 11c. The reduction drive 12 is a gear reducer with parallel axes. As illustrated in FIG. 4, the reduction drive 12 has a first gear 12a, a second gear 12b, and a third gear 12c. The first gear 12a meshes with an output gear 11f that is fixed to the motor shaft 11c. The output gear 11f is located between the partition wall 111 and the second bearing 11e. The first gear 12a has a larger diameter than the output gear 11f.

The first gear 12a integrally rotates with a first shaft 12d. The first shaft 12d is parallel with the motor shaft 11c. In detail, the first shaft 12d extends in the left-right direction at a position behind the motor shaft 11c. The housing 100 supports the first shaft 12d in a manner to allow rotation thereof.

The second gear 12b is located on the left side of the first gear 12a. The second gear 12b integrally rotates with the first shaft 12d and the first gear 12a. The second gear 12b has a smaller diameter than the first gear 12a.

The third gear 12c meshes with the second gear 12b. The third gear 12c has a larger diameter than the second gear 12b. The third gear 12c integrally rotates with a second shaft 12e. The second shaft 12e is parallel with the motor shaft 11c and the first shaft 12d. In detail, the second shaft 12e extends in the left-right direction at a position behind and below the first shaft 12d. The housing 100 supports the second shaft 12e in a manner to allow rotation thereof.

The second shaft 12e is connected to a driveshaft 93 via the differential 91. As illustrated in FIG. 2, the driveshaft 93 extends in the left-right direction at a position behind the drive system P. The reduction drive 12 reduces the output of the drive motor 11 at a specified reduction ratio, and outputs the reduced output to the differential 91.

(Overview of Oil Supply System for Drive System)

The drive system P includes a supply system 5 that supplies oil for lubrication and/or cooling to each of the drive motor 11, the reduction drive 12, and the generator 13. The supply system 5 includes an oil pump 51, an oil cooler 52, an oil passage 6, and an oil pipe 7. The oil pipe 7 is divided into a first oil pipe 71 and a second oil pipe 72.

An oil reservoir 105 is formed in a lower portion of the second chamber 102 on the inside of the housing 100. As will be described below, the oil that is supplied to each of the drive motor 11, the reduction drive 12, and the generator 13 falls due to a gravitational force. In the left-right direction, the oil that has fallen flows toward a center of the housing 100 and is collected in the lower portion of the second chamber 102. The oil circulates in the housing 100.

A strainer 53 is installed in the oil reservoir 105. The strainer 53 separates the oil from foreign substances. In addition, an oil temperature sensor 54 is installed in the oil reservoir 105. The oil temperature sensor 54 measures a temperature of the oil that is accumulated in the oil reservoir 105.

The oil pump 51 is attached to the outside of the housing 100. The oil pump 51 is attached to a lower portion of the housing 100. The oil pump 51 suctions the oil in the oil reservoir 105 through the strainer 53, and discharges the oil from a discharge port. The oil pump 51 is electrically operated.

The first oil pipe 71 is connected to the discharge port of the oil pump 51. The first oil pipe 71 is disposed in the second chamber 102. The first oil pipe 71 connects the oil pump 51 to the oil cooler 52.

The oil cooler 52 is a water-cooled heat exchanger and exchanges heat between cooling water and the oil. In addition to the oil, the cooling water cools the electric drive unit 10 and the control unit 20 in the drive system P. The oil cooler 52 has an inlet port 521 and an outlet port 522 for the cooling water.

The oil cooler 52 is disposed on a downstream side of the oil pump 51 in the oil supply system 5. The oil cooler 52 is located on the front side in a lower portion of the first housing 110. In the up-down direction, the oil pump 51 and the oil cooler 52 are located at substantially the same height. As illustrated in FIG. 4, this position corresponds to a position below the drive motor 11. The oil cooler 52 is arranged in a state of not being projected forward from a front end of the housing 100. This arrangement is advantageous in enhancing collision safety of the vehicle 1.

A first through hole 112 and a second through hole 113 are formed in the partition wall 111 of the first housing 110 (see FIG. 4). Each of the first through hole 112 and the second through hole 113 extends in a substantially radial direction, and communicates between the inside and the outside of the housing 100. These first through hole 112 and second through hole 113 are cast holes that are formed at the time of casting, for example. An oil inlet port 521 of the oil cooler 52 is connected to the first through hole 112, and an oil outlet port 522 thereof is connected to the second through hole 113.

The first oil pipe 71 is connected to the first through hole 112. The second oil pipe 72 is connected to the second through hole 113. The second oil pipe 72 connects the oil cooler 52 and the oil passage 6.

The oil passage 6 is constructed of a main passage 60, a plurality of distribution passages 61 to 67, and a supply passage 68. These passages 60 to 68 are cast holes that are formed at the time of casting, for example.

The main passage 60 is located in an upper end portion of the housing 100. The main passage 60 extends in the left-right direction. The main passage 60 extends across the right end cover 130, the first housing 110, the second housing 120, and the left end cover 140.

The distribution passages 61 to 67 are branched from the main passage 60. The first distribution passage 61 is formed at a right end of the right end cover 130. Through the first distribution passage 61, the oil is primarily supplied to the stator 11b and the first bearing 11d of the drive motor 11.

The second distribution passage 62 is formed at a left end of the right end cover 130. Through the second distribution passage 62, the oil is primarily supplied to the stator 11b of the drive motor 11.

The third distribution passage 63 is formed adjacently on the right side of the partition wall 111 of the first housing 110. Through the third distribution passage 63, the oil is primarily supplied to the stator 11b of the drive motor 11.

The fourth distribution passage 64 is formed in the partition wall 121 of the second housing 120. The fourth distribution passage 64 extends downward from the main passage 60 to the vicinity of positions of the motor shaft 11c and the generator shaft 13c. The fourth distribution passage 64 supplies the oil to the rotor 11a of the drive motor 11, the second bearing 11e, the third bearing 13d, and the rotor 13a of the generator 13 through the motor shaft 11c and the generator shaft 13c.

The fifth distribution passage 65 is formed adjacently on the left side of the partition wall 121 of the second housing 120. Through the fifth distribution passage 65, the oil is primarily supplied to the stator 13b of the generator 13.

The sixth distribution passage 66 is formed in the middle of the second housing 120 in the left-right direction. Through the sixth distribution passage 66, the oil is primarily supplied to the stator 13b of the generator 13.

The seventh distribution passage 67 is formed in the left end cover 140. Through the seventh distribution passage 67, the oil is primarily supplied to the stator 13b of the generator 13 and the fourth bearing 13e.

The supply passage 68 is formed in the partition wall 111 of the first housing 110. As illustrated in FIG. 4, the supply passage 68 is formed directly above the motor shaft 11c. Through the supply passage 68, the oil is supplied to the main passage 60. An upper end of the supply passage 68 is connected to the main passage 60. In addition, the supply passage 68 extends downward from the main passage 60. A lower end of the supply passage 68 is located above the motor shaft 11c and near an outer circumference portion of the rotor 11a of the drive motor 11. The supply passage 68 supplies the oil to the rotor 11a of the drive motor 11, and supplies the oil to the reduction drive 12.

A communication hole 681 is formed at an intermediate position of the supply passage 68. The communication hole 681 is opened to the left on a left surface of the partition wall 111. The second oil pipe 72 is connected to the communication hole 681.

The oil that is discharged by the oil pump 51 flows through the first oil pipe 71, the oil cooler 52, and the second oil pipe 72 in this order and flows into the supply passage 68. The oil flows from the supply passage 68 to the main passage 60 through each of the distribution passages 61 to 67, or flows from the supply passage 68, and is then supplied to each of the drive motor 11, the reduction drive 12, and the generator 13.

(Detailed Structure of Oil Pipe)

The oil supply system 5 includes the oil passage 6 and the oil pipe 7. The oil pipe 7 feeds the oil from the lower portion of the housing 100 to the upper portion thereof. An oil supply route can easily be formed by attaching the oil pipe 7, which is a separate body from the housing 100, to the housing 100.

As illustrated in FIG. 4 and FIG. 5, in the housing 100, the oil pipe 7 is located between the drive motor 11 and the generator 13. The reduction drive 12 is also located between the drive motor 11 and the generator 13. The positions of the first shaft 12d and the second shaft 12e are offset (not aligned) in the up-down direction and the front-rear direction. Accordingly, at a position behind the motor shaft 11c, the reduction drive 12 expands obliquely downward from a height position of the motor shaft 11c when seen from the left side to the right side.

An outer circumferential shape of each of the drive motor 11 and the generator 13 is a circular shape with respective one of the motor shaft 11c and the generator shaft 13c being a center. The drive motor 11 and the generator 13 have the same diameter as each other. Part of an outer circumferential shape of the housing 100 is an arcuate shape with each of the motor shaft 11c and the generator shaft 13c being the center.

The reduction drive 12 is located off to the rear of the motor shaft 11c. Accordingly, as illustrated in FIG. 4, in the second chamber 102 between the drive motor 11 and the generator 13, an empty space is provided in front of the motor shaft 11c. Since the outer circumferential shape of the housing 100 is the arcuate shape, the empty space is relatively large. At least part of the oil pipe 7, more precisely, the second oil pipe 72, is located in the large empty space. When the inside of the housing 100 is seen from the left to the right, the second oil pipe 72 is located in an overlapping manner with the drive motor 11.

The first oil pipe 71 is located below the motor shaft 11c and the first gear 12a. In the second chamber 102, the first oil pipe 71 is also located in the empty space away from the reduction drive 12. When the inside of the housing 100 is seen from the left to the right, the first oil pipe 71 is also located in the overlapping manner with the drive motor 11.

The first oil pipe 71 and the second oil pipe 72 are disposed around the motor shaft 11c. At least part of the oil pipe 7 is located on an opposite side of the reduction drive 12 with the motor shaft 11c being interposed therebetween in the front-rear direction. The front-rear direction is an example of the second direction. The second direction is a direction that is orthogonal to the first direction as a direction of the motor shaft 11c. However, the second direction is not limited to the front-rear direction.

In this drive system P, there is an ample arrangement space for the oil pipe 7. This structure facilitates the assembly work of the oil pipe 7 during manufacturing of the drive system P.

In addition, since the oil pipe 7 is divided into the first oil pipe 71 and the second oil pipe 72, it is possible to increase a degree of freedom in layout of the oil reservoir 105, the oil cooler 52, and the oil passage 6.

First Oil Pipe

Figure 7:
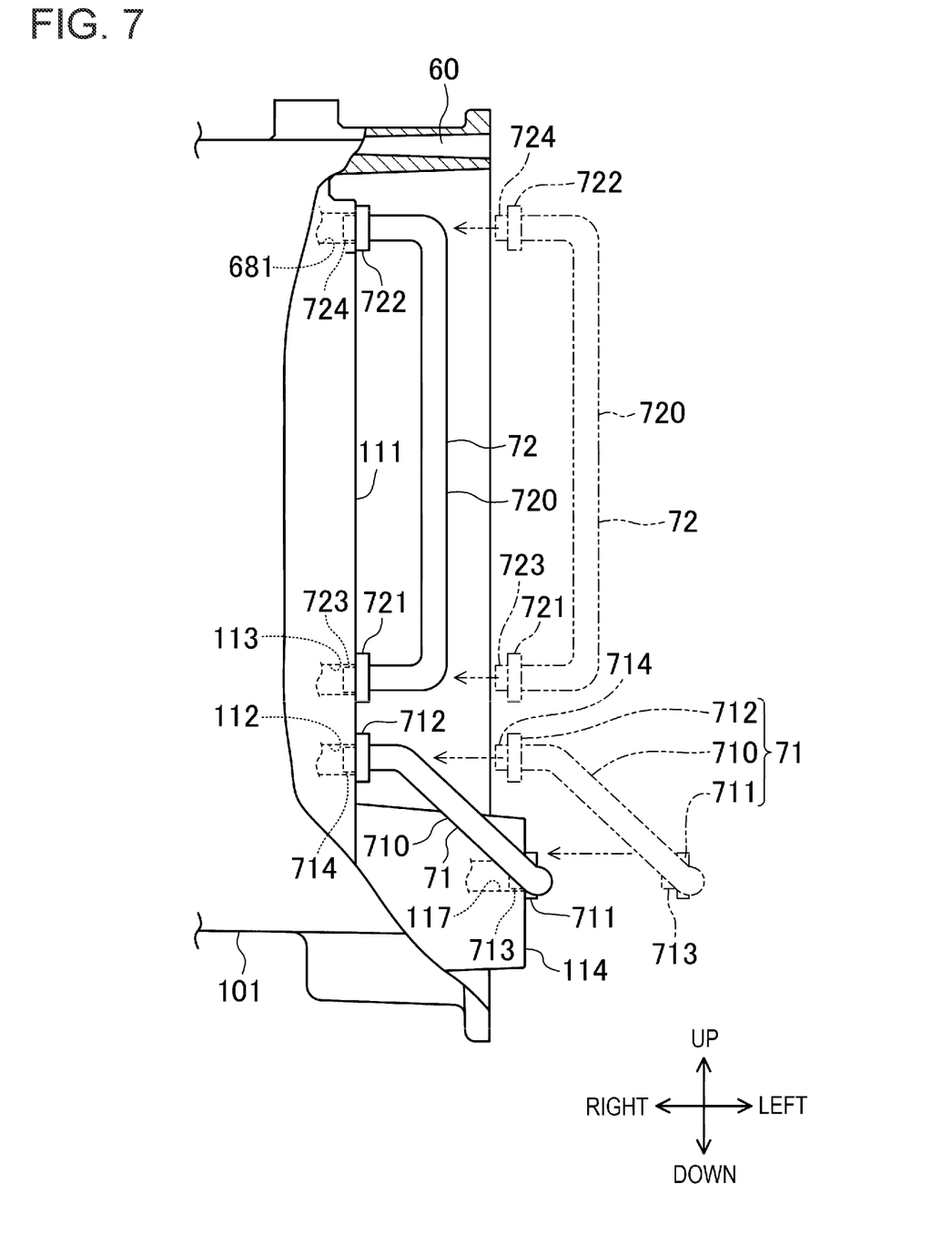
FIG. 7 illustrates an attachment direction of an oil pipe to a housing.

As illustrated in FIG. 7, the first oil pipe 71 is constructed of a pipe-shaped main body 710, a first flange 711, and a second flange 712. A first end and a second end of the main body 710 are each bent. The first flange 711 is fixed to the first end of the main body 710, and the second flange 712 is fixed to the second end of the main body 710. An attachment surface of the first flange 711 faces to the right. An attachment surface of the second flange 712 also faces to the right.

Figure 6:
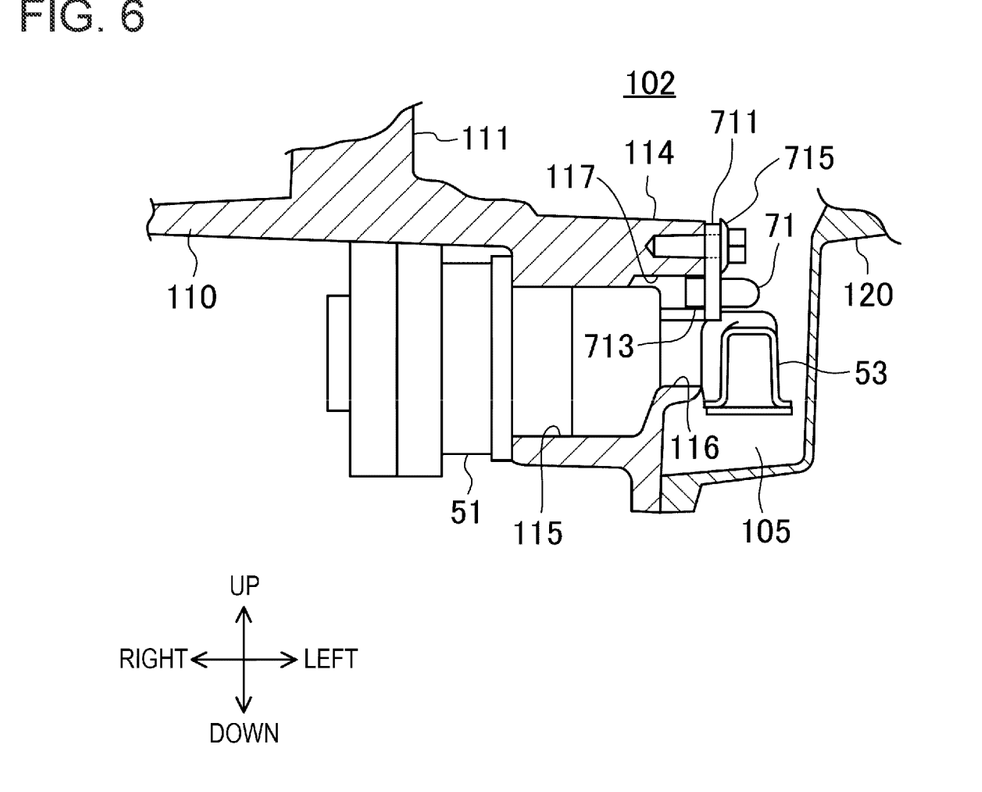
FIG. 6 illustrates a cross section that is taken along VI-VI in FIG. 4.

A first end of the first oil pipe 71 is located below the first shaft 12d of the reduction drive 12. The first end is an inlet end. As illustrated in FIG. 6, the first flange 711 fixes the first end to a lateral wall 114 of the first housing 110. The lateral wall 114 is a wall that separates the inside of the first housing 110 from the outside in the lower portion of the first housing 110. The lateral wall 114 is shifted to the left from the partition wall 111.

The lateral wall 114 is provided with a recessed section 115. On the outside of the first housing 110, the recessed section 115 is recessed from right to left. The oil pump 51 is fixed to the first housing 110 in a state where part of the oil pump 51 is accommodated in the recessed section 115.

The lateral wall 114 is formed with two connection holes 116, 117. The two connection holes 116, 117 communicate between the inside and the outside of the housing 100. Each of the two connection holes 116, 117 extends in the left-right direction through the lateral wall 114.

A suction port of the oil pump 51 is connected to an opening of the first connection hole 116 on the outer side of the housing 100. The strainer 53 is connected to an opening of the first connection hole 116 on the inner side of the housing 100. The oil pump 51 suctions the oil in the oil reservoir 105 from the suction port through the strainer 53 and the first connection hole 116.

A discharge port of the oil pump 51 is connected to an opening of the second connection hole 117 on the outer side of the housing 100. The first end of the first oil pipe 71 is connected to an opening of the second connection hole 117 on the inner side of the housing 100.

The opening of the second connection hole 117 on the inner side of the housing 100 is opened to the left. The first flange 711 has an insertion end 713. As illustrated in FIG. 7, the insertion end 713 is inserted in the opening of the second connection hole 117 in the direction from the left to the right. The right-facing attachment surface of the first flange 711 abuts a left-facing surface of the lateral wall 114. The first flange 711 is fastened to the lateral wall 114 by a bolt 715

(see FIG. 4 or FIG. 6). The first end of the first oil pipe 71 is connected to the discharge port of the oil pump 51 through the second connection hole 117.

As illustrated in FIG. 4, a second end of the first oil pipe 71 is located below the motor shaft 11c. The second end is an outlet end. The second flange 712 fixes the second end to the partition wall 111 of the first housing 110.

As described above, the partition wall 111 is formed with the first through hole 112. The first through hole 112 is connected to the oil inlet port 521 of the oil cooler 52. As indicated by broken lines in FIG. 7, an opening of the first through hole 112 on the inside of the housing 100 is opened to the left.

The second flange 712 has an insertion end 714. The insertion end 714 is inserted in the opening of the first through hole 112 in the direction from the left to the right. The right-facing attachment surface of the second flange 712 abuts the left-facing surface of the partition wall 111. The second flange 712 is fastened to the partition wall 111 by a bolt 716 (see FIG. 4). The second end of the first oil pipe 71 is connected to the oil outlet port 521 of the oil cooler 52 through the first through hole 112.

The insertion end 713 of the first flange 711 and the insertion end 714 of the second flange 712 are respectively inserted in the holes 117, 112, each of which is formed in the housing 100 and opened to the left, and the first oil pipe 71 is thereby attached to the housing 100. During manufacturing of the drive system P, a worker only needs to insert the two insertion ends 713, 714 of the first oil pipe 71 from the openings of the holes 117, 112 in the direction from the left to the right, respectively. This structure facilitates the assembly work of the drive system P. Here, the left-right direction, the front-rear direction, and the up-down direction are defined with the mounted state of the drive system P on the vehicle 1 as the reference, and the directions during the assembly are also defined on the basis of such a reference. However, the left-right direction, the front-rear direction, and the up-down direction during the assembly of the drive system P may not always match the left-right direction, the front-rear direction, and the up-down direction in the mounted state of the drive system P, respectively. For example, in the case where the first housing 110 is vertically arranged during the assembly of the drive system P, the holes 117, 112 are opened upward. Accordingly, the two insertion ends 713, 714 of the first oil pipe 71 may be inserted in the openings of the holes 117, 112 in a direction from top to bottom.

In addition, during manufacturing of the drive system P, the worker attaches the oil pump 51 to the housing 100 such that the discharge port of the oil pump 51 is connected to the first connection hole 116, and attaches the first oil pipe 71 to the housing 100 as described above. Since the oil pump 51 and the first oil pipe 71 are not directly connected, assemblability is improved.

Here, as illustrated in FIG. 4, when seen in the direction from the left to the right, the second end of the first oil pipe 71 is located on the upper front side of the first end. In addition, as illustrated in FIG. 5 or FIG. 7, when seen in the direction from the front to the rear, the second end of the first oil pipe 71 is located on the right side of the first end. The first end and the second end of the first oil pipe 71 are offset (not aligned) in the up-down direction and in the left-right direction. The main body 710 of the first oil pipe 71 is bent in the middle in the up-down direction, and is also bent in the middle in the left-right direction. Since the main body 710 is bent, interference between the main body 710 and a rib 124 for reinforcing the first boss 122 is avoided (see an imaginary line in FIG. 4). The rib 124 extends outward in the radial direction from the first boss 122.

Second Oil Pipe

As illustrated in FIG. 7, the second oil pipe 72 is constructed of a pipe-shaped main body 720, a first flange 721, and a second flange 722. A first end and a second end of the main body 720 are each bent. The first flange 721 is fixed to the first end of the main body 720, and the second flange 722 is fixed to the second end of the main body 720. An attachment surface of the first flange 721 faces to the right. An attachment surface of the second flange 722 also faces to the right.

As illustrated in FIG. 4, the first end of the second oil pipe 72 is located on the lower front side of the motor shaft 11c. The first end is an inlet end. The first flange 721 fixes the first end to the partition wall 111 of the first housing 110.

As described above, the partition wall 111 is formed with the second through hole 113. The second through hole 113 is connected to the oil outlet port 522 of the oil cooler 52. As indicated by broken lines in FIG. 7, an opening of the second through hole 113 on the inside of the housing 100 is opened to the left.

The first flange 721 has an insertion end 723. The insertion end 723 is inserted in the opening of the second through hole 113 in the direction from the left to the right. The right-facing attachment surface of the first flange 721 abuts the left-facing surface of the partition wall 111. The first flange 721 is fastened to the partition wall 111 by a bolt 725 (see FIG. 4). The first end of the second oil pipe 72 is connected to the oil outlet port 522 of the oil cooler 52 through the second through hole 113.

The second end of the second oil pipe 72 is located above the motor shaft 11c. The second end is an outlet end. The second flange 722 fixes the second end to the partition wall 111.

As described above, the partition wall 111 is formed with the supply passage 68 and the communication hole 681 that communicates with the supply passage 68. The communication hole 681 is opened to the left on the left surface of the partition wall 111.

The second flange 722 has an insertion end 724. The insertion end 724 is inserted in the opening of the communication hole 681 in the direction from the left to the right. The right-facing attachment surface of the second flange 722 abuts the left-facing surface of the partition wall 111. The second flange 722 is fastened to the partition wall 111 by a bolt 726 (see FIG. 4). The second end of the second oil pipe 72 is connected to the supply passage 68 through the communication hole 681.

The insertion end 723 of the first flange 721 and the insertion end 724 of the second flange 722 are respectively inserted in the holes 113, 681, each of which is opened to the left, and the second oil pipe 72 is also thereby attached to the housing 100. During manufacturing of the drive system P, the worker only needs to insert the two insertion ends 723, 724 of the second oil pipe 72 from the openings of the holes 113, 681 in the direction from the left to the right, respectively. This structure facilitates the assembly work of the drive system P. In the same way as above, the left-right direction, the front-rear direction, and the up-down direction during the assembly of the drive system P may not always match the left-right direction, the front-rear direction, and the up-down direction in the mounted state of the drive system P on the vehicle 1, respectively.

Here, as illustrated in FIG. 4, when seen in the direction from the left to the right, the second end of the second oil pipe 72 is located on the upper rear side of the first end. In addition, as illustrated in FIG. 5 or FIG. 7, when seen in the direction from the front to the rear, the first end and the second end of the second oil pipe 72 are located at the same position in the left-right direction. The main body 720 of the second oil pipe 72 extends linearly. Due to the linear shape of the main body 720, a length of the second oil pipe 72 is the shortest. As a result, channel resistance of the second oil pipe 72 is reduced. In addition, moldability of the linear second oil pipe 72 is high.

The structure of the oil pipe 7 is not limited to the structure of being divided into the first oil pipe 71 and the second oil pipe 72. The oil pipe 7 may be a single component. The oil pipe 7 may be divided into three or more oil pipes.

(Harness for Oil Temperature Sensor)

As described above, the oil temperature sensor 54 is installed in the oil reservoir 105. A harness 55 that is connected to the oil temperature sensor 54 is disposed in the second chamber 102. In detail, in the first housing 110, the harness 55 is disposed along an arcuate outer circumferential portion thereof. In this way, the harness 55 can be disposed at a position away from the reduction drive 12. Even in the case where a defect such as disconnection of the harness 55 occurs, the harness 55 is suppressed from being entangled in the reduction drive 12.

The first oil pipe 71 and the second oil pipe 72 are interposed between the harness 55 and the reduction drive 12. As illustrated in FIG. 5 or FIG. 7, the first oil pipe 71 and the second oil pipe 72 are respectively arranged such that both of the end portions of the main bodies 710, 720 are raised from the partition wall 111. Thus, even when the defect of the harness 55 occurs, the harness 55 interferes with the first oil pipe 71 or the second oil pipe 72. As a result, the harness 55 is more effectively restrained from becoming entangled in the reduction drive 12.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
11 Drive motor
11c Motor shaft
12 Reduction drive
13 Generator
100 Housing
105 Oil reservoir
111 Partition wall
117 Second connection hole
51 Oil pump
52 Oil cooler
6 Oil passage
681 Communication hole
7 Oil pipe
71 First oil pipe
713 Insertion end (second insertion end)
72 Second oil pipe
724 Insertion end (first insertion end)
P Drive system

The invention claimed is:

1. A vehicle drive system comprising:
a vehicle travel motor having a motor shaft that extends in a first direction orthogonal to an up-down direction;
a generator that is located on a side of the motor in the first direction and generates electricity to be supplied to the motor;
a reduction drive that is located between the motor and the generator in the first direction and meshes with the motor shaft to reduce output of the motor; and
a housing that accommodates the motor, the reduction drive, and the generator, wherein
at a position above the motor shaft, an oil passage, through which oil is supplied to each of the motor, the reduction drive, and the generator, is integrally formed with the housing,
the housing has an oil reservoir for storing the oil in a lower portion of the housing,
an oil pipe that is attached to the housing within the housing and supplies the oil from the oil reservoir to the oil passage is further provided,
at a position between the motor and the generator, the reduction drive is offset from the motor shaft in a second direction that is orthogonal to the first direction,
the oil pipe is located between the motor and the generator in the first direction, and at least part of the oil pipe is located on an opposite side of the reduction drive with the motor shaft being interposed therebetween in the second direction, and
at least a portion of the oil pipe is arranged to overlap the motor when viewed from the first direction.

2. The vehicle drive system according to claim 1, wherein
the housing has a partition wall that is located between the motor and the reduction drive,
part of the oil passage is formed in the partition wall, and, in the partition wall, a communication hole connected to the oil passage is opened toward the first direction, and
the oil pipe has a first insertion end that is inserted in an opening of the communication hole in the first direction.

3. The vehicle drive system according to claim 2 further comprising:
an oil pump that is attached to outside of the housing, suctions the oil in the oil reservoir, and discharges the oil from a discharge port, wherein
the housing is formed with a connection hole, to which the discharge port is connected, in a manner to penetrate the housing from inside to outside thereof, and the connection hole is opened toward the first direction in the housing, and
the oil pipe has a second insertion end that is inserted in an opening of the connection hole along the first direction.

4. The vehicle drive system according to claim 3 further comprising:
an oil cooler that is attached to the outside of the housing and cools the oil at a position between the oil reservoir and the oil passage, wherein
the oil pipe is divided into:
a first oil pipe that couples the oil reservoir and the oil cooler, and
a second oil pipe that couples the oil cooler and the oil passage.

5. The vehicle drive system according to claim 4, wherein
the oil cooler is located on an opposite side of the reduction drive with the motor shaft being interposed therebetween in the second direction and below the motor shaft, and
the second oil pipe extends linearly from a connection position with the oil cooler and a connection position with the oil passage.

6. The vehicle drive system according to claim 1 further comprising:
an oil cooler that is attached to the outside of the housing and cools the oil at a position between the oil reservoir and the oil passage, wherein
the oil pipe is divided into:
a first oil pipe that couples the oil reservoir and the oil cooler, and
a second oil pipe that couples the oil cooler and the oil passage.

7. The vehicle drive system according to claim 6, wherein
the oil cooler is located on an opposite side of the reduction drive with the motor shaft being interposed therebetween in the second direction and below the motor shaft, and
the second oil pipe extends linearly from a connection position with the oil cooler and a connection position with the oil passage.

* * * * *